US012567433B2

(12) United States Patent
Sellam et al.

(10) Patent No.: US 12,567,433 B2
(45) Date of Patent: Mar. 3, 2026

(54) AUTOMATED EVALUATION OF SYNTHESIZED SPEECH USING CROSS-MODAL AND CROSS-LINGUAL TRANSFER OF LANGUAGE ENCODING

(71) Applicant: GOOGLE LLC, Mountain View, CA (US)

(72) Inventors: Thibault Sellam, Brooklyn, NY (US); Ankur Bapna, New York, NY (US); Joshua Camp, London (GB); Diana Mackinnon, London (GB); Ankur P. Parikh, New York, NY (US); Jason Riesa, San Francisco, CA (US)

(73) Assignee: Google LLC, Mountain View, CA (US)

( * ) Notice: Subject to any disclaimer, the term of this patent is extended or adjusted under 35 U.S.C. 154(b) by 348 days.

(21) Appl. No.: 18/334,876

(22) Filed: Jun. 14, 2023

(65) Prior Publication Data

US 2024/0420726 A1     Dec. 19, 2024

(51) Int. Cl.
| | |
|---|---|
| *G10L 25/69* | (2013.01) |
| *G10L 15/00* | (2013.01) |
| *G10L 15/06* | (2013.01) |
| *G10L 15/16* | (2006.01) |

(52) U.S. Cl.
CPC ............ *G10L 25/69* (2013.01); *G10L 15/005* (2013.01); *G10L 15/063* (2013.01); *G10L 15/16* (2013.01)

(58) Field of Classification Search
CPC ..... G10L 25/69; G10L 15/005; G10L 15/063; G10L 15/16
See application file for complete search history.

(56) References Cited

U.S. PATENT DOCUMENTS

2022/0067309 A1     3/2022   Sellam et al.

OTHER PUBLICATIONS

Y. Tachioka, "Multi-condition Training and System Combination for Automatic MOS Prediction," 2022 IEEE 11th Global Conference on Consumer Electronics (GCCE), Osaka, Japan, 2022, pp. 346-347, doi: 10.1109/GCCE56475.2022.10014285. (Year: 2022).*
Erica Cooper, et al., "Generalization Ability of MOS Prediction Networks", IEEE International Conference on Acoustics, Speech and Signal Processing (ICASSP), arXiv:2110.02635v3 [eess.AS], Feb. 14, 2022, 5 pages.

(Continued)

*Primary Examiner* — Daniel C Washburn
*Assistant Examiner* — Penny L Caudle
(74) *Attorney, Agent, or Firm* — Honigman LLP; Brett A. Krueger; Grant Griffith

(57)     ABSTRACT

A method for evaluating synthesized speech, including receiving a speech sample in a first language; and determining a rating of the speech sample based on an encoding of the speech sample by an artificial intelligence encoding model, the rating of the speech sample corresponding to a naturalness of the speech sample, wherein the encoding of the speech sample is based on a first training stage of the encoding model using a first set of training data and a second training stage of the encoding model using a second set of training data, the first set of training data includes unlabeled speech audio, unlabeled text, and paired speech audio and text data in the first language and at least one additional language, and the second set of training data includes rated speech audio.

18 Claims, 4 Drawing Sheets

(56)                     References Cited

OTHER PUBLICATIONS

Wen-Chin Huang, et al., "The VoiceMOS Challenge 2022", Proc. Interspeech (ISCA), Sep. 18-22, 2022, pp. 4536-4540, doi: 10.21437/Interspeech.2022-970.

Adriana Stan, "The ZevoMOS entry to VoiceMOS Challenge 2022", Proc. Interspeech (ISCA), Sep. 18-22, 2022, pp. 4516-4520, doi: 10.21437/Interspeech.2022-105.

Takaaki Saeki, et al., "UTMOS: UTokyo-SaruLab System for VoiceMOS Challenge 2022", Proc. Interspeech (ISCA), Sep. 18-22, 2022, pp. 4521-4525, doi: 10.21437/Interspeech.2022-439.

Quoc-Huy Nguyen, et al., "Automatic Mean Opinion Score Estimation with Temporal Modulation Features on Gammatone Filterbank for Speech Assessment", Proc. Interspeech (ISCA), Sep. 18-22, 2022, pp. 4526-4530, doi: 10.21437/Interspeech.2022-528.

Michael Chinen, et al., "Using Rater and System Metadata to Explain Variance in the VoiceMOS Challenge 2022 Dataset", Proc. Interspeech (ISCA), Sep. 18-22, 2022, pp. 4531-4535, doi: 10.21437/Interspeech.2022-799.

Wei-Cheng Tseng, et al., "DDOS: a MOS Prediction Framework utilizing Domain Adaptive Pre-training and Distribution of Opinion Scores", Proc. Interspeech (ISCA), Sep. 18-22, 2022, pp. 4541-4545, doi: 10.21437/Interspeech.2022-11247.

Xiaohai Tian, et al., "A Multi-Task and Transfer Learning based Approach for MOS Prediction", Proc. Interspeech (ISCA), Sep. 18-22, 2022, pp. 5438-5442, doi: 10.21437/Interspeech.2022-10022.

Zhengdong Yang, et al., "Fusion of Self-supervised Learned Models for MOS Prediction", Proc. Interspeech (ISCA), Sep. 18-22, 2022, pp. 5443-5447, doi: 10.21437/Interspeech.2022-10262.

Ankur Bapna, et al., "mSLAM: Massively multilingual joint pre-training for speech and text", Computer Science, Computation and Language, arXiv:2202.01374v1 [cs.CL], Feb. 3, 2022, 15 pages.

International Search Report and Written Opinion issued Jul. 30, 2024, in PCT/US2024/023863, 14 pages.

Sellam Thibault et al: "SQuId: Measuring Speech Naturalness in Many Languages", ICASSP 2023-2023 IEEE International Conference on Acoustics, Speech and Signal Processing (ICASSP), IEEE, Jun. 4, 2023, pp. 1-5, XP034450305, DOI: 10.1109/ICASSP49357.2023.10094909 [retrieved on May 5, 2023].

* cited by examiner

AUTOMATED EVALUATION OF SYNTHESIZED SPEECH USING CROSS-MODAL AND CROSS-LINGUAL TRANSFER OF LANGUAGE ENCODING

BACKGROUND

Field of the Disclosure

The present disclosure relates to processing and evaluating synthesized speech.

Description of the Related Art

Synthesized speech can refer to machine-generated speech that is used to communicate or convey information to listeners. The quality of synthesized speech can depend on the content of the speech as well as audible characteristics such as tone or emphasis. There is a need to predict a quality or a comprehensibility of synthesized speech in order to evaluate the computerized system that generates the synthesized speech.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The foregoing paragraphs have been provided by way of general introduction and are not intended to limit the scope of the following claims. The described embodiments, together with further advantages, will be best understood by reference to the following detailed description taken in conjunction with the accompanying drawings.

In one embodiment, the present disclosure is related to a method for evaluating synthesized speech, comprising receiving, via processing circuitry, a speech sample in a first language; and determining, via the processing circuitry, a rating of the speech sample based on an encoding of the speech sample by an artificial intelligence encoding model, the rating of the speech sample corresponding to a naturalness of the speech sample, wherein the encoding of the speech sample is based on a first training stage of the encoding model using a first set of training data and a second training stage of the encoding model using a second set of training data, the first set of training data includes unlabeled speech audio, unlabeled text, and paired speech audio and text data in the first language and at least one additional language, and the second set of training data includes rated speech audio.

In one embodiment, the present disclosure is related to a device comprising processing circuitry configured to receive a speech sample in a first language, and determine a rating of the speech sample based on an encoding of the speech sample by an artificial intelligence encoding model, the rating of the speech sample corresponding to a naturalness of the speech sample, wherein the encoding of the speech sample is based on a first training stage of the encoding model using a first set of training data and a second training stage of the encoding model using a second set of training data, the first set of training data includes unlabeled speech audio, unlabeled text, and paired speech and text data in the first language and at least one additional language, and the second set of training data includes rated speech audio.

In one embodiment, the present disclosure is related to a non-transitory computer-readable storage medium for storing computer-readable instructions that, when executed by a computer, cause the computer to perform a method, the method comprising receiving a speech sample in a first language; and determining a rating of the speech sample based on an encoding of the speech sample by an artificial intelligence encoding model, the rating of the speech sample corresponding to a naturalness of the speech sample, wherein the encoding of the speech sample is based on a first training stage of the encoding model using a first set of training data and a second training stage of the encoding model using a second set of training data, the first set of training data includes unlabeled speech audio, unlabeled text, and paired speech and text data in the first language and at least one additional language, and the second set of training data includes rated speech audio.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
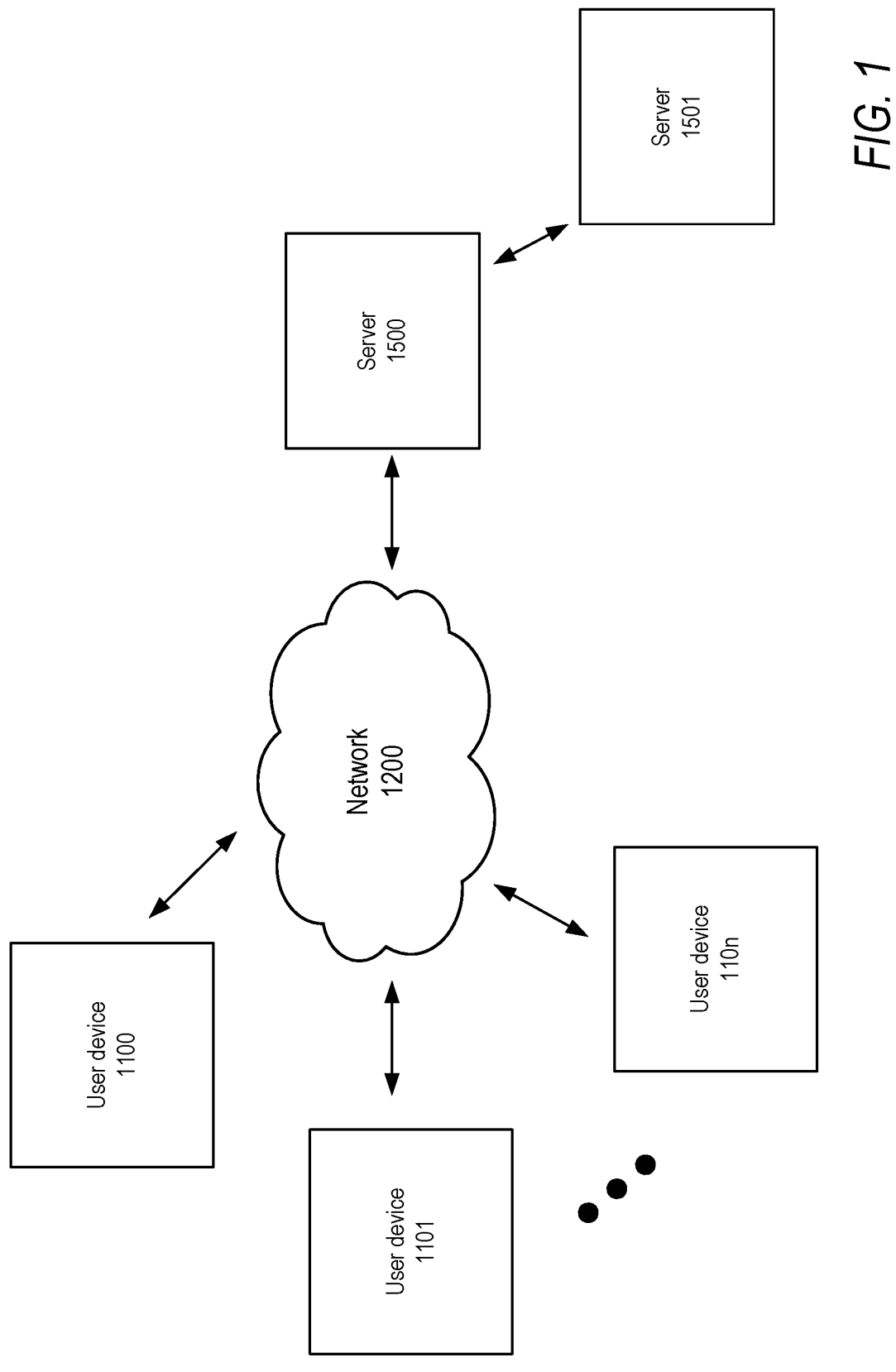
FIG. 1 is a schematic of a networked system for evaluating speech.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Natural language generation is a process by which machines can synthesize and output artificial speech. Artificial speech, or synthesized speech, can be implemented in a variety of devices and environments to facilitate speech-based and audio-based interactions between humans and machines and can be used as an alternative for, or a supplement to, visual content. Text-to-speech (TTS) can refer to the pipeline or system for generating artificial speech wherein a text is generated, analyzed, and converted to an audio waveform that is output by a machine as synthesized speech. The effectiveness of a TTS system can depend on a variety of factors related to consumption and processing of audio content, such as the content, intelligibility, prosody, pitch, and dynamics of the synthesized speech. The audible characteristics of the synthesized speech need to match the content (e.g., the text) as well as the context of the synthesized speech. In some instances, it can also be desirable to mask the automation involved in synthesizing speech so that a listener believes the speech may have been generated (spoken) by another human rather than by a machine.

The wide range of use cases for synthesized speech and the variety of ongoing improvements in natural language generation results in a need for an efficient and standardized system for evaluating synthesized speech and the relationship between synthesized speech and human speech. In many implementations, the quality of synthesized speech is evaluated to determine a naturalness of the synthesized speech. In some implementations, naturalness can be related to a similarity to a real or a hypothetical human utterance. In some embodiments, naturalness can be related to how effective or clear the synthesized speech is. Quality of synthesized speech can also be evaluated based on a correctness of the synthesized speech (e.g., whether the synthesized speech includes mispronounced words) and an appropriateness of the synthesized speech. Traditionally, the quality of the synthesized speech is determined by human evaluators with or without a reference to human utterance. However, the assessment can be subjective, and the use of human evaluators can be inefficient and impractical when scaling large datasets of natural language generation outputs. There is therefore a need to develop an automated model that can effectively and accurately evaluate quality of synthesized speech.

In one embodiment, the present disclosure is directed towards systems and methods for evaluating synthesized speech using a statistical model that has been trained in stages on a combination of multilingual text and speech data. The statistical model as referenced herein can refer to an artificial intelligence (AI) model or a model that has been trained for evaluation using machine learning techniques on the combination of multilingual text and speech data. For example, the statistical model can include a neural network of one or more layers of neurons between an input layer and an output layer. The statistical model can be an encoding model, wherein the encoding model can encode an input (e.g., a sample of synthesized speech) to generate an output (e.g., an evaluation metric). The statistical model can be stored, trained, and hosted or executed by one or more servers. The server can store and/or access audio data, including synthesized speech, and can evaluate the synthesized speech for a similarity to human speech using the statistical model. In one embodiment, the server can run the statistical model in order to assign a score to the speech to quantify the relationship between the speech and human speech. In one embodiment, the server can extract characteristics of the speech that are related to, or indicative of, a similarity to human speech. According to some examples, the training and execution of the statistical model can be distributed across more than one server.

FIG. 1 is a schematic of a networked device, such as a server 1500, in communication with one or more devices wherein the server can evaluate speech samples, according to one embodiment of the present disclosure. The user devices 1100, 1101, 110n can be, for example, computers, such as those that will be described in further detail herein with reference to FIG. 3 and FIG. 4. The server 1500 can be a hardware device such as a computer, as described herein with reference to FIG. 3 and FIG. 4. The server 1500 can be in communication with the one or more devices via a communication network 1200 such that data can be transmitted between the devices and the server. The server can store the statistical model and can train and run the statistical model. In some embodiments, the server can store the training data or can retrieve the training data from a remote device, such as a second server 1501. The server can retrieve the training data from the remote device via the communication network 1200. In some embodiments, the server can be more than one server, wherein the more than one server can store and/or run parts (e.g., layers) of the statistical model. A device 1100 can access the statistical model by transmitting an input to the server 1500 over the communication network 1200. The input can be, for example, a speech sample to be evaluated. The server 1500 can receive the speech sample and run the statistical model using the speech sample as an input to generate an output, wherein the output is an evaluation of the input speech sample. The server 1500 can transmit the output over the communication network 1200 to the device 1100. In one embodiment, the device can store and run the statistical model or a portion of the statistical model locally on the device hardware.

The statistical model can be referred to herein as a speech evaluation model. The statistical model can include an encoder, wherein the encoder can generate a map, vector, or similar structure to characterize an input, such as a speech sample. The map or vector can represent the features of the input that the statistical model is trained to identify. The output of the encoder can be used as an input into a decoder, wherein the decoder can map the input to a second output based on the features of the input that are encoded by the encoder. The second output can be, for example, a rating of the speech sample. The statistical model can include, for example, at least one deep neural network, such as a convolutional neural network (CNN) or re current neural network (RNN), or a transformer. The structure of the statistical model can include combinations of known neural networks and/or can include modified layers in known neural networks to optimize the learning ability and/or the evaluation accuracy of the statistical model. The parameters of the statistical model can be set during the training stages, as well be described herein. The statistical model can be trained using self-supervised learning (SSL) or semi-supervised learning. In some embodiments, the statistical model can be trained for a combination of tasks related to speech evaluation, including, but not limited to, phoneme recognition, speaker or source identification, evaluation of emotional states, or speech comprehension.

Figure 2:
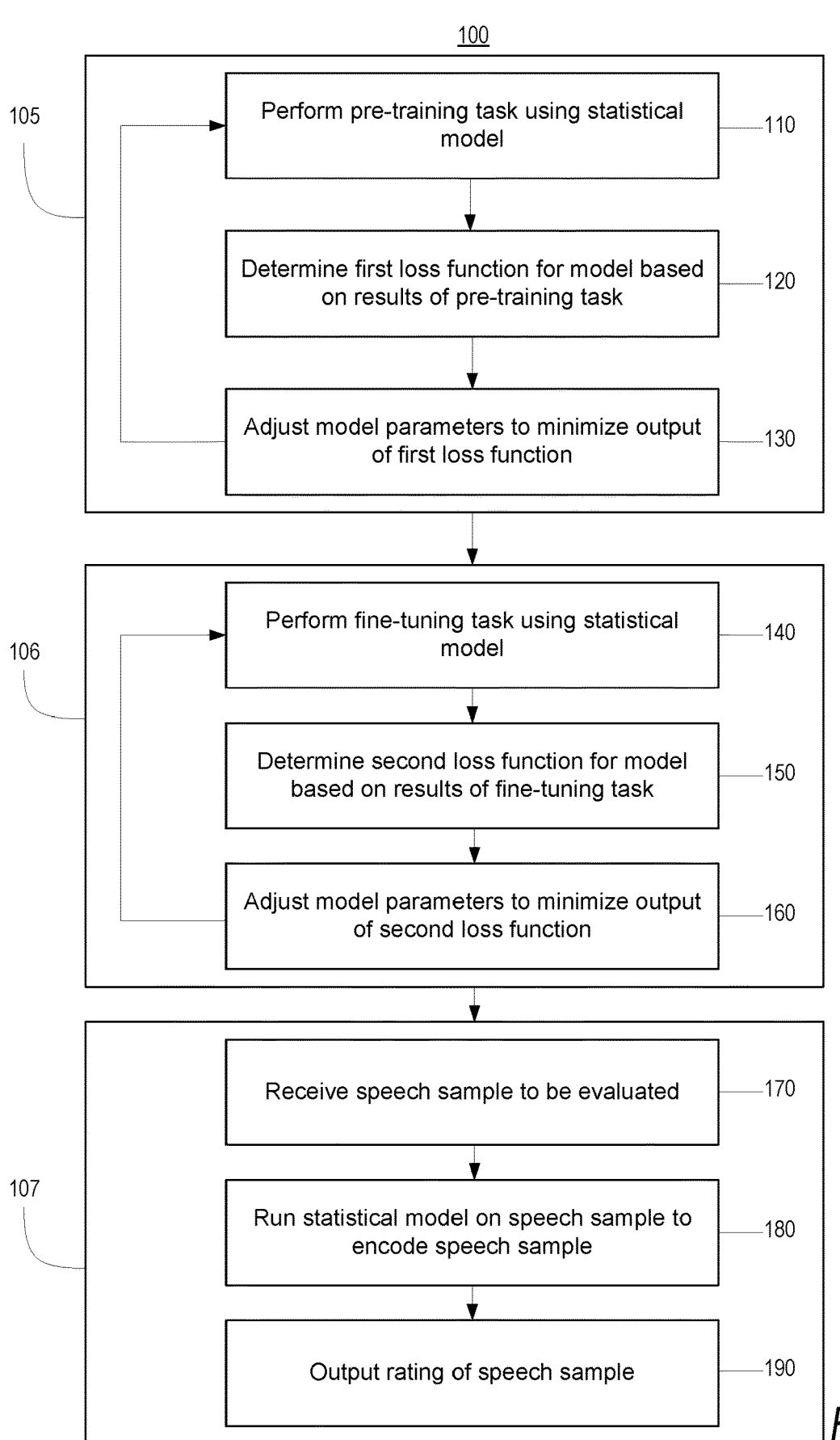
FIG. 2 is a method for training and using a statistical model to evaluate speech.

FIG. 2 is a method for training the statistical model and evaluating speech, according to one embodiment of the present disclosure. The server can train the statistical model in a first training stage 105 and a second training stage 106. The first training stage can be referred to herein as a pre-training stage, while the second training stage can be referred to herein as a fine-tuning stage. The server can train the statistical model in the first training stage using a first set of training data and in the second training stage using a second set of training data. In the first training stage, the server can perform one or more pre-training tasks by running the statistical model on the first set of training data in step 110 to output a prediction of speech or text. The pre-training tasks can include, for example, predicting masked language or mapping speech to text. The server can compare the output of the statistical model with the first set of training data to determine an accuracy of the statistical model, e.g., a prediction accuracy. The server can calculate a loss function in step 120, wherein the loss function models the difference, deviation, or distance between the output of the statistical model, e.g., a prediction, and the first set of training data, which includes the actual value that was predicted by the statistical model. In one embodiment, the server can determine one or more parameters of the statistical model that reduce or minimize the output of the loss function. The one or more parameters can include, for example, neuron weights, biases, dropout rates, etc. The server can set the one or more parameters of the statistical model in step 130. The server can perform the pre-training task again by running the modified statistical model on the first set of training data. The server can repeat the steps of the first training stage 105, including performing a pre-training task in step 110, calculating the loss function in step 120, and adjusting the statistical model in step 130 until the output of the loss function is below a threshold of acceptability.

In the second training stage, the server can perform one or more fine-tuning tasks after pre-training is complete by running the statistical model on the second set of training data. The fine-tuning tasks can be, for example, related to evaluating the quality of a speech sample. In one embodiment, the server can modify the statistical model before performing the one or more fine-tuning tasks. The modifications can include, for example, modifying one or more layers of the statistical model or modifying a hyperparameter of the statistical model. In one embodiment, the server can freeze a portion of the statistical model before the one or more fine-tuning tasks. Freezing can refer to fixing the parameters (e.g., weights) and architecture of the one or more layers that have already been configured during the first training stage in order to preserve the results of the first training stage. In one embodiment, the second set of training data can include speech samples that have been rated in a quality evaluation test. The server can perform the fine-tuning task by providing the second set of training data as an input to the statistical model. The server can run the statistical model on the second set of training data to generate a rating output for each sample in the second set of training data in step 140. The server can compare the rating output for each sample to the actual rating of the speech sample, which is part of the second set of training data. The server can calculate a second loss function in step 150, wherein the second loss function models the difference, deviation, or distance between the rating output for each sample and the actual rating of the sample. In one embodiment, the server can determine one or more parameters of the statistical model that minimize the output of the second loss function. The one or more parameters can include, for example, neuron weights, biases, dropout rates, etc. The server can set the one or more parameters of the statistical model in step 160. The server can perform the fine-tuning task again by running the modified statistical model on the second set of training data. The server can repeat the steps of the second training stage 106, including performing a fine-tuning task in step 140, calculating the second loss function in step 150, and adjusting the statistical model in step 160 until the output of the second loss function is below a threshold of acceptability.

The server can evaluate a speech sample using the trained statistical model in step 107. The server can receive a speech sample in step 170. The speech sample can be, for example, a synthesized speech sample from a TTS system. The server can use the statistical model to evaluate the speech sample in step 180. In some embodiments, the evaluation of the speech sample can include encoding the speech sample to extract features of the speech sample. The server can assign a rating to the speech sample based on the extracted features of the speech sample and output the rating in step 190. The rating can be assigned according to the fine-tuning training of the statistical model and can correspond to a quality of the speech sample, such as correctness, naturalness, appropriateness, similarity to human speech, etc.

Returning now to the first training stage 105, the server can perform one or more pre-training tasks using various representations of language in the first set of training data in order to train the statistical model for language recognition and processing. In one embodiment, the first set of training data can include unlabeled speech data, unlabeled text data, and paired speech and text data. The unlabeled speech data can include recordings of speech, recordings of text that is read aloud (without the corresponding text), and recordings of conversations between speakers. The unlabeled text data can include text from various sources, such as books, articles, written correspondence, etc. The paired speech and text data can include speech data and corresponding text representations of the speech data. The paired speech and text data can include speech data that originates from text data as well as text data that originates from speech data. For example, the paired speech and text data can include an audio recording of a reading from a book paired with the text of the book as a first sample and a recording of a conversation paired with a transcript of the conversation as a second sample. The speech data and the text data used in the paired speech and text data can be different from, or can overlap with, the unlabeled speech data and the unlabeled text data. The training data can include speech and text data of varying length, formality, and complexity. The audio of the unlabeled speech data and the paired speech data can include non-speech audio and noise from various sources. In one embodiment, the server can train the statistical model using character-based tokenization by splitting the training data into individual characters as inputs. Character-based tokenization can be useful when the training data is multilingual, as will be discussed in further detail herein. Word-based tokenization and sentence piece tokenization, which is language-independent, are also compatible with the present disclosure.

In one embodiment, the first set of training data can include multilingual speech data and text data. For example, the unlabeled speech data can include readings in various languages and the unlabeled text data can include text in various languages, e.g., up to 65 languages, 65 languages, or more than 65 languages. The languages in the first set of training data can include low-resource languages and high-resource languages. In some implementations, the server can up-sample low-resource languages to provide more samples for training, e.g., using temperature sampling. In some embodiments, the first set of training data can include native speech and text that has been generated in a first language as well as translated speech and text, e.g., samples that have been translated from a second language to the first language. The use of a multilingual dataset can improve the recognition ability of the statistical model for each individual language included in the multilingual dataset. For example, training the statistical model on languages such as Spanish or German can improve the performance of the statistical model in evaluating English speech samples when compared with a model that is only trained on English data.

The server can train the statistical model on a number of pretraining tasks related to language comprehension in the first training stage. Examples of the pretraining tasks can include, but are not limited to, mapping speech and text, predicting words in speech or text, and determining a sequence of words in speech or text. The server can perform the pretraining tasks to train the statistical model to recognize and represent language in speech as well as in text. In one embodiment, the server can train the statistical model to map speech data to text data and/or text data to speech data. The statistical model can determine relationships between the two language modalities, as well as relationships within speech data and text data. In one embodiment, the server can generate vectors in a vector space to represent speech data and/or text data based on the first set of training data. In one embodiment, the vectors can include mapping vectors between speech data and text data. For example, the paired speech and text data can be used as training examples for how audio data (speech) corresponds to text data. The server can map speech data to text data and similarly text data to speech data in order to represent a relationship between the two language modalities. In some embodiments, the mapping can include building contextualized representations of speech data and/or text data. In some implementations, the server can train the statistical model using more than one pretraining task in parallel. According to one embodiment, the server can train the statistical model to carry out the pretraining tasks on each of the types of data in the first set of training data (unlabeled speech, unlabeled text, paired speech and text) or on a subset of data in the first set of training data.

In one embodiment, the server can train the statistical model to map speech data to text data using connectionist temporal classification (CTC) during the first stage of training. CTC can refer to a classification of sequences of data based on a likelihood of alignment between the sequences at a point in time. In the present example, an audio data sample (speech) can be paired with a corresponding text representation (transcript) of the audio in the paired speech and text data. However, the alignment of the audio sample and the corresponding text may not be known and can be complicated by variations in speech, especially for longer sequences. The server can train the statistical model to predict an alignment between paired speech data and text data using CTC. The alignment can include synchronization of a point in time in the speech data (e.g., when a syllable is spoken) with a corresponding character or group of characters representing the point of time (e.g., the syllable) in the text data. In the first training stage, the server can input the speech data into the statistical model and can train the statistical model using the paired text data as a target. The server can train the statistical model to map the speech data input to the paired text data with the proper alignment.

CTC can provide probability distributions for the likelihood of alignment between two sequences of data at a point in time. The server can use the statistical model to predict one or more possible alignments between two sequences, wherein the server can calculate a score or probability of each alignment. In some embodiments, the server can calculate the likelihood probability of each alignment by computing a loss function for alignments within a sequence. A neural network, such as an RNN, can be used to estimate probabilities of alignments within a sequence. The alignments can then be merged to determine a probability of an alignment as a whole. The server can train the statistical model to determine an increased or maximal likelihood of alignment between two sequences. The server can assign one or more classification labels to an input data sequence at a point in time. The classification label can correspond to a point in a target data sequence, indicating an alignment with the input data sequence at that point. The classification label can be associated with a probability of the point in the input data sequence being aligned with the point in the target data sequence. For example, the classification label can be a phoneme identified in a speech sample, the phoneme being part of a word or group of words in a paired text sample (transcript). The server can use CTC to determine a probability that the phoneme is an accurate representation of what was said in the audio sample. In one implementation, the server can train the statistical model using CTC with a coefficient for paired CTC loss of approximately 0.03. The training of the statistical model for CTC using the first set of training data can improve the performance of the statistical model in aligning speech and text representations of language.

In one embodiment, the server can mask the training data in order to train the statistical model to predict speech and/or text. Masking can refer to the removal (masking) of components in a sequence of text or speech. The components can be, for example, a word or a sequence of words. The server can mask a sample from the training data and use the statistical model to predict the word or sequence of words that would fill in the masked components in the sample. The server can mask both the speech data and the text data such that the statistical model is trained to predict missing speech as well as missing text. In one embodiment, the server can mask the paired speech and text data. The server can thus train the statistical model to predict how sentences are formed and how missing speech or text data can be replaced. Masking can improve the ability of the statistical model to process context and meaning in language. Training the statistical model on masked speech data as well as masked text data results in cross-modal transfer of learning for the different representations of language to improve prediction ability for both speech data and text data.

In one embodiment, the server can mask the training data and use the predicted output for CTC. For example, the server can mask paired speech and text data. The server can train the statistical model to predict the missing speech and text for the respective data samples and generate predicted speech data and predicted text data. The server can use the predicted speech data as an input into the statistical model for CTC training, with the paired text data as the target data. The server can train the statistical model to align the predicted speech data with the predicted text data. In one embodiment, the text data can be a character-level transcript. In some embodiments, the combination of predicting masked data and alignment using CTC in sequential or linked training steps can improve the accuracy of alignment of the statistical model.

In one embodiment, the server can use the statistical model to predict whether a first sample of training data is followed by a second sample of training data. For example, a recorded speech can be split into multiple audio samples. In one embodiment, the server can use the statistical model to predict whether a second sample directly follows a first sample. In one embodiment, the server can use the statistical model to reconstruct the full speech by determining an order of the audio samples based on the content of the audio samples. The content of the audio samples can include the content of the spoken language as well as additional speech cues, such as the tone of the speaker's voice, changes in volume or pitch, etc. The server can identify the content of the audio samples based on the training of the statistical model. The server can use the statistical model to recognize continuity as well as incongruities (contrast) between and within the audio samples.

The first stage of training can include iterative training steps. For example, the server can modify the statistical model during training in order to improve performance on the pretraining tasks that have been described herein. For example, the server can generate or can retrieve paired speech and text samples for training. The paired samples can have known characteristics, such as a language, an alignment between speech and text, an audio quality, etc. The server can then use a portion of the generated sample as an input for a pretraining task of the statistical model. For example, the server can mask a portion of the sample and use the statistical model to predict the word or sequence of words that is missing from the sample. The server can compare a prediction output of the statistical model with the unmasked sample and can determine a loss value as a measure of the difference or deviation between the predicted output and the unmasked sample. The loss value can be, for example, a multi-class loss, a regression loss, or any similar loss value that can be calculated using a loss function. The server can modify the statistical model in order to minimize the output of the loss function. The modifications can include changes to parameters of the statistical model, such as nodes, weights, or layers. The parameters can define the statistical model and can modify the mapping and output of the statistical model. In one embodiment, the server can modify hyperparameters of the statistical model. The hyperparameters can affect the training of the statistical model. For example, the hyperparameters can include a learning rate or a batch size of training data that is input to the statistical model. The server can repeat the pre-training task (e.g., predicting a masked word) until the output of the loss function is below a threshold of acceptability.

The server can train the statistical model to recognize representations of language in the first training stage. The recognition of speech can include distinguishing spoken language from other sounds and noise in an audio sample. In some embodiments, the recognition of speech can include determining the language of the speech and the linguistic content of the speech. According to some embodiments, the server can train the statistical model to determine characteristics of the speech or the speaker, such as a context or a tone. The characteristics of the speech can be dynamic and time-varying. The server can use the statistical model to determine if speech is present in an audio sample, the location of the speech in the audio sample, and the language of the speech in the audio sample. In one embodiment, the server can use the statistical model to generate a text representation of the speech in the audio sample. The text representation can be generated based on the vector space that was generated by the statistical model during the training stage.

As an exemplary implementation, the server can use an Adam optimizer for the first training stage with a Transformer learning rate schedule. In one embodiment, the server can increase the learning rate of the statistical model during the first training stage, followed by an inverse square root decay of the learning rate during the first training stage. In one embodiment, the server can apply a loss (e.g., dropout) to the statistical model to avoid overfitting. The coefficient of speech loss can be 1.0, the coefficient of text loss can be 0.3, and the coefficient of paired CTC loss can be 0.03.

Addressing now the second training stage, the server can fine-tune the statistical model in the second training stage to evaluate the quality of a speech sample. In one embodiment, the statistical model can be fine-tuned to evaluate a speech sample and assign a score to the speech sample. The score can be a measure of the quality of the speech sample. In one example, the score can be a measure of a relationship between the sample and human speech. In one embodiment, the score can be a measure of a relationship between a first speech sample and a second speech sample. For example, a first speech sample can be synthesized by a first speech synthesis system and a second speech sample can be synthesized by a second speech synthesis system. The second system can be, in some cases, an alternative system or a different version of the first system. In one example, the second system can be a known or trusted speech synthesis system with an output that has been previously evaluated or verified. The statistical model can be fine-tuned to evaluate and compare the quality of the first speech sample and the second speech sample.

According to one example, the score can be related to or based on a mean opinion score (MOS), which is a metric of quality evaluation used for telecommunications. Mean opinion scores are typically determined in a quality evaluation test that includes categorical rating scales. Subjects listen to speech samples and assign ratings to the speech samples based on how similar the speech sounds to human speech. The ratings can indicate whether the listener believes that the speech sample is produced by a machine or by a human. A rating can be a quantity that corresponds to a categorical rating scale. The MOS rating can be a mean of the ratings assigned by human listeners to a speech sample in the quality evaluation test. Obtaining MOS ratings from human listeners can be inefficient and expensive. Therefore, there is a need to predict MOS ratings as quality indicators for speech samples without requiring quality evaluation tests to be conducted for each sample. The prediction of MOS ratings can provide an accurate and consistent metric for evaluating the quality of speech samples. The ratings can be an evaluation of the similarity between the sample and human speech or a likelihood that the sample is human speech. The server can use the statistical model of the present disclosure to process the speech samples and predict an evaluation using the MOS ratings. The prediction of MOS ratings can indicate whether machine-synthesized speech samples can effectively imitate human speech. For example, a speech sample can be synthesized by a TTS model. The server can evaluate the synthesized speech sample using the statistical model to determine whether the TTS model is capable of artificially synthesizing humanlike speech. Alternatively or additionally, the server can use the statistical model to evaluate the quality of a speech sample using a different metric known to one of ordinary skill in the art.

In one embodiment, the second set of training data for the second training stage can include speech samples and ratings of the speech samples. The speech samples can include synthesized speech samples from a machine as well as natural speech samples from a human. For example, the training data can include a library of speech samples and the MOS ratings that were assigned to the speech samples during quality evaluation tests. In one embodiment, the synthesized speech samples can originate from more than one speech generation system. The length of the speech samples can vary. In some implementations, the speech samples can be utterances, wherein each utterance is assigned a rating from a quality evaluation test. An utterance can refer to a continuous piece of speech. For example, an utterance can be a sequence that is spoken without pauses interrupting the sequence. A length of an utterance can vary from a single syllable to a sequence of words. The server can train the statistical model for utterance-level evaluation. In some embodiments, the server can train the statistical model for frame-level or system-level evaluation. The speech samples can include speech samples in various languages. In one example, the languages used in the second training stage can be a subset of the languages used in the first training stage and/or can include languages that were not included in the first training stage. In some embodiments, the server can modify the speech samples in the second set of training data before fine-tuning the statistical model, e.g., by changing the speed of utterance in the sample, trimming the sample, or buffering the sample with silence. In some embodiments, the second set of training data can include text data that has been rated for quality evaluation. In one embodiment, the second set of training data can include language identifiers for the utterances in the second set of training data.

In some embodiments, the server can fine-tune the statistical model that has been trained in the first training stage by freezing one or more layers of the statistical model and using the statistical model to perform one or more fine-tuning tasks using the second set of training data. In one embodiment, one or more layers of the model are not frozen. The server can modify the parameters of the layers that are not frozen as a result of the training on the second set of training data. In some embodiments, the server can fine-tune the statistical model that has been trained in the first training stage by adding one or more layers to the statistical model, wherein the additional layers have not been previously trained or configured. The server can then train the statistical model using the second set of training data. The additional layers will be trained from scratch on the second set of training data, while the original layers can be frozen or can be modified based on the fine-tuning tasks. In one embodiment, the additional layers can be one or more output layers. In one embodiment, the additional layers can be pooling layers. The additional layers can include fully connected layers for linear projection and rescaling. The parameters of linear projection functions can be determined during the second training stage.

In one embodiment, the server can fine-tune the statistical model that has been trained in the first training stage by changing the learning rate of the model during the second training stage. For example, the server can set the learning rate of the statistical model to increase linearly during the first training stage, followed by a decay in the learning rate during the second training stage. The decrease in the learning rate during the second training stage can preserve the results of the first training stage while tuning the statistical model on the second set of training data, which may be smaller than the first set of training data. The methods for fine-tuning the statistical model can be implemented by the server individually or in combination with each other or with any other method for fine-tuning a statistical model known to one of ordinary skill in the art. The server can fine-tune the statistical model on one or more tasks related to speech evaluation in a similar manner to the first training stage. For example, the server can input a speech sample that has been assigned a quality evaluation rating to the statistical model and determine a rating of the speech sample using the statistical model. The server can compare the rating output of the statistical model to the actual rating of the speech sample to determine a loss value based on a loss function. The server can modify parameters of the statistical model to minimize the output of the loss function. The server can repeat the fine-tuning tasks until the output of the loss function is below a threshold of acceptability.

The use of multilingual training data can result in cross-lingual transfer of learning, wherein the prediction accuracy of the server for each language can improve as a result of the statistical model being trained on the number of languages. As an example, the server can expose the statistical model to samples of varying quality across the number of languages in the training data and can train the statistical model to recognize characteristics of speech in each language. Poor speech quality can refer to speech that is robotic or sounds like machine-synthesized speech. Samples with poor speech quality can include characteristics such as mispronunciation, lack of auditory clarity or intelligibility, or lack of tone and affect in the speech. Incoherence, or lack of meaning, in the words or word groupings in a sample can also be content-based characteristics of poor speech quality. Good speech quality can refer to speech that sounds like human speech. Samples with good speech quality can include characteristics, especially temporal characteristics, such as dynamic volume, tone, emphasis, pacing, etc. The server can train the statistical model to identify and encode the characteristics of speech across the number of languages. Identification and encoding of the characteristics in a first language can be transferrable and can enable identification and encoding of the characteristics in a second language. The identification and encoding of characteristics of speech in each language can affect how the statistical model can be used to encode and evaluate speech samples in any language.

Furthermore, the use of a combination of unlabeled speech, unlabeled text, and paired speech and text data in the training data can result in cross-modal transfer of learning, wherein the prediction accuracy of the server in evaluating speech samples can improve based on the training with unlabeled text and paired speech and text data when compared with a statistical model that is only trained on speech data. The training on the unlabeled text and the paired speech and text data can provide additional representations of language and the characteristics of language. Training the statistical model to process and encode the unlabeled text and the paired speech and text can improve the accuracy of the server in processing unlabeled speech. Similarly, training the statistical model to process and encode unlabeled speech can improve the accuracy of the server in processing unlabeled text.

The server can train the statistical model in two stages to process a speech sample and assign a rating, such as an MOS rating, to the speech sample as a measure of the quality of the speech sample. It can be appreciated that a rating, such as a MOS rating, as presented herein, is a non-limiting example of a measure of quality. The systems and methods of the present disclosure can also be used to evaluate speech samples based on qualities including, but not limited to, naturalness, correctness, and appropriateness. The statistical model can be trained on speech samples that have been assigned indicators (e.g., ratings) of any of these qualities. In one embodiment, the server can use the statistical model to predict whether the speech sample is produced by a machine or by a human. In one embodiment, the rating of the speech sample can correspond to a likelihood or probability that the speech sample is produced by a machine. The rating of the speech sample can correspond to a quality of the speech sample, such as naturalness, correctness, accuracy. In one implementation, the server can use the statistical model to predict whether the speech sample will be processed and interpreted as human speech by a listener. The server can use the statistical model to recognize and evaluate speech samples in a number of languages. The server does not need to encode the language of the speech sample as an input into the statistical model.

In an example implementation, the server can receive an input, wherein the input is a speech sample. In some embodiments, the input can include metadata related to the speech sample. The metadata can include, but is not limited to, language identifiers of utterances in the speech sample or an input text corresponding to the speech sample (e.g., a transcript or a source text used for TTS synthesis). In some embodiments, the language identifier can include a locale tag indicating language and other characteristics of the speech sample, such as cultural or location-specific references or modes of speech. In one embodiment, the server can read a language identifier and can generate or correct predictions based on the identified language. In some embodiments, the server can evaluate a speech sample without a language identifier. In one embodiment, the server can receive the input from a device over a communication network. The server can determine an MOS rating for the speech sample by running the statistical model on the speech sample. The MOS rating can be a measure of the quality of the speech sample. The server can output the MOS rating as an evaluation of the speech sample input. In some embodiments, the server can transmit the output to the device that transmitted the speech sample.

In one embodiment, the server can use the statistical model for split testing or comparative evaluation. For example, the server can input a first speech sample and a second speech sample to the statistical model. The server can use the statistical model to evaluate each speech sample and determine a relative quality of each speech sample. In one embodiment, the relative quality can include a first MOS rating for the first speech sample and a second MOS rating for the second speech sample. In one embodiment, the relative quality can include a determination of whether the first speech sample or the second speech sample sounds more natural, e.g., more like human speech. The server can thus use the statistical model to evaluate speech samples from different speech generation systems, such as different versions of a speech generation system or a control speech generation system and an experimental speech generation system. In one embodiment, the server can train the statistical model to output a determination of which speech sample is of higher quality when the first speech sample and the second speech sample are input to the statistical model. In one embodiment, the server can train the statistical model to generate and evaluate intermediate representations or transformations of utterances. For example, instead of inputting a speech sample into the statistical model, the server can use the statistical model to generate a representation of the speech sample based on the speech sample. The server can then use the statistical model to evaluate the representation of the speech sample to determine a quality of the speech sample.

In one embodiment, the server can use the statistical model to evaluate the quality of text samples. The server can train the statistical model using the combination of unlabeled speech, unlabeled text, and paired speech and text data, as has been described herein. In one embodiment, the server can fine-tune the statistical model using rated text data in addition to or in place of the speech data. In one example, the server can input a text sample into the statistical model, wherein the text sample was synthesized by a natural language processor. The server can use the statistical model to predict a rating for the text sample, the rating being a measure of a likelihood that the text sample was written by a human rather than synthesized by a machine. If the natural language processor is effective, the server can determine using the statistical model that the text sample is of good quality and that it resembles human language. If the natural language processor is not effective, the server can determine using the statistical model that the text sample is of poor quality and that it does not resemble human language. The characteristics of the text sample that can indicate the quality of the text sample can include word usage, structure, grammar, organization, meaning, etc. In one embodiment, the server can use the statistical model to evaluate text samples in various languages without encoding or inputting the language of the text sample to the statistical model. In one embodiment, the server can use the statistical model to evaluate the quality of a paired speech and text sample. The paired speech and text sample can be, for example, a synthesized text sample and the speech that was produced based on the synthesized text sample by a TTS system.

Embodiments of the subject matter and the functional operations described in this specification can be implemented by digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus, such as the networked device or server 1500 and 1501, the devices 1100, 1101, 110*n*, and the like. The computer storage medium can be a machine-readable storage device, a machine-readable storage substrate, a random or serial access memory device, or a combination of one or more of them.

The term "data processing apparatus" refers to data processing hardware and may encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both, or any other kind of central processing unit. Generally, a CPU will receive instructions and data from a read-only memory or a random access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, mag-neto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be imple-mented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients (user devices) and servers. A client and server are generally remote from each other and typically interact through a communication network. The relationship of client and server arises by virtue of computer programs running on the respective computers and having a client-server relationship to each other. In an embodiment, a server transmits data, e.g., an HTML page, to a user device, e.g., for purposes of display-ing data to and receiving user input from a user interacting with the user device, which acts as a client. Data generated at the user device, e.g., a result of the user interaction, can be received from the user device at the server.

Figure 3:
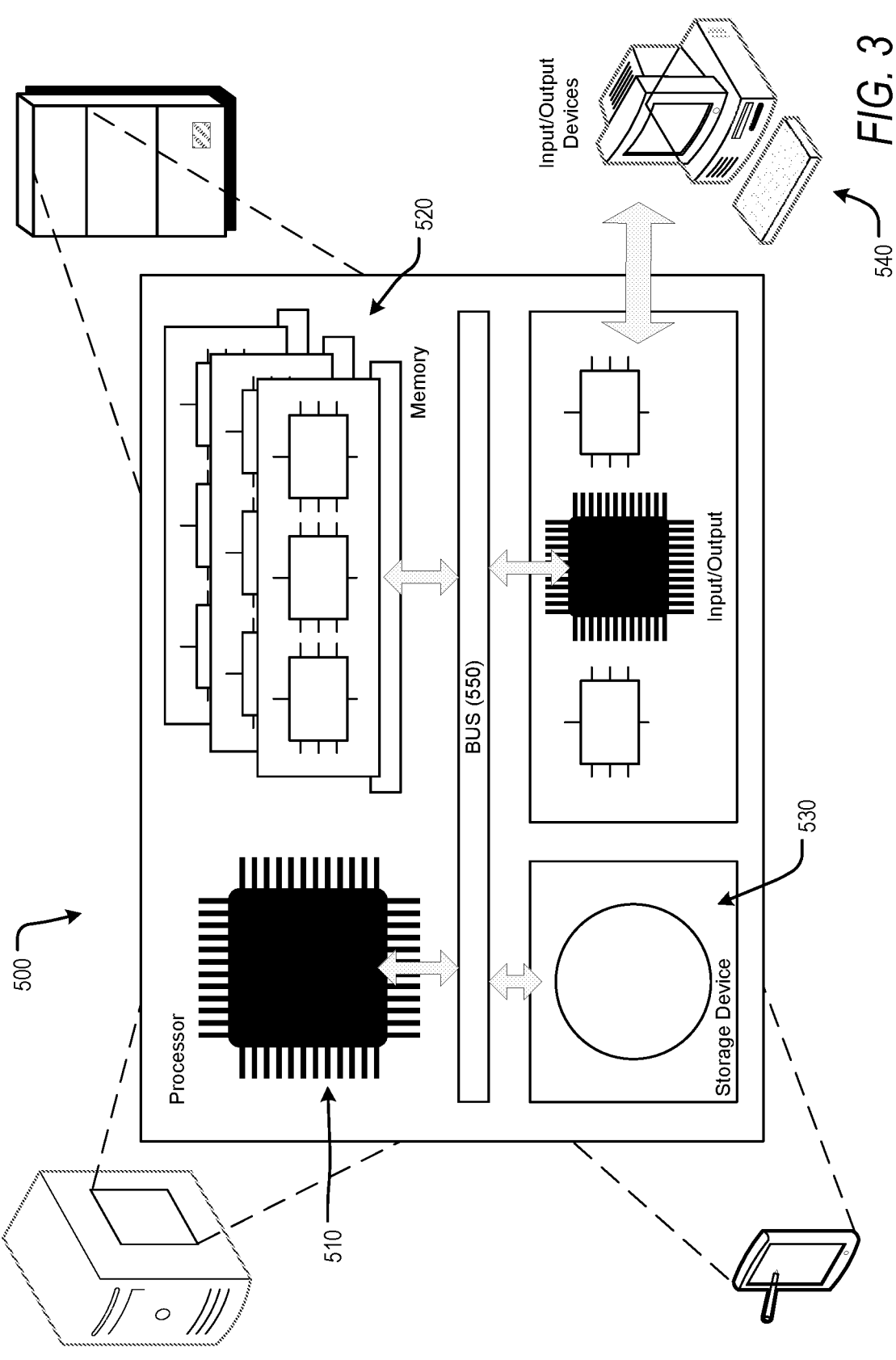
FIG. 3 is a schematic of a hardware system for performing a method, according to an exemplary embodiment of the present disclosure.

An example of a type of computer is shown in FIG. 3. The computer 500 can be used for the operations described in association with any of the computer-implement methods described previously, according to one implementation. For example, the computer 500 can be an example of a net-worked device such as the servers 1500 and 1501 including processing circuitry, as discussed herein. In some embodi-ments, the computer 500 can be an example of any of the user devices 1100, 1101, 110$n$ in communication with the networked device via the network 1200. The processing circuitry includes one or more of the elements discussed next with reference to FIG. 3. In FIG. 3, the computer 500 includes a processor 510, a memory 520, a storage device 530, and an input/output device 540. Each of the compo-nents 510, 520, 530, and 540 are interconnected using a system bus 550. The processor 510 is capable of processing instructions for execution within the system 500. In one implementation, the processor 510 is a single-threaded pro-cessor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the computer 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the computer 500. In one implementation, the storage device 530 is a computer-readable medium. In various different implementations, the storage device 530 may be a floppy disk device, a hard disk device, an optical disk device, or a tape device.

The input/output device 540 provides input/output opera-tions for the computer 500. In one implementation, the input/output device 540 includes a keyboard and/or pointing device. In another implementation, the input/output device 540 includes a display unit for displaying graphical user interfaces.

Figure 4:
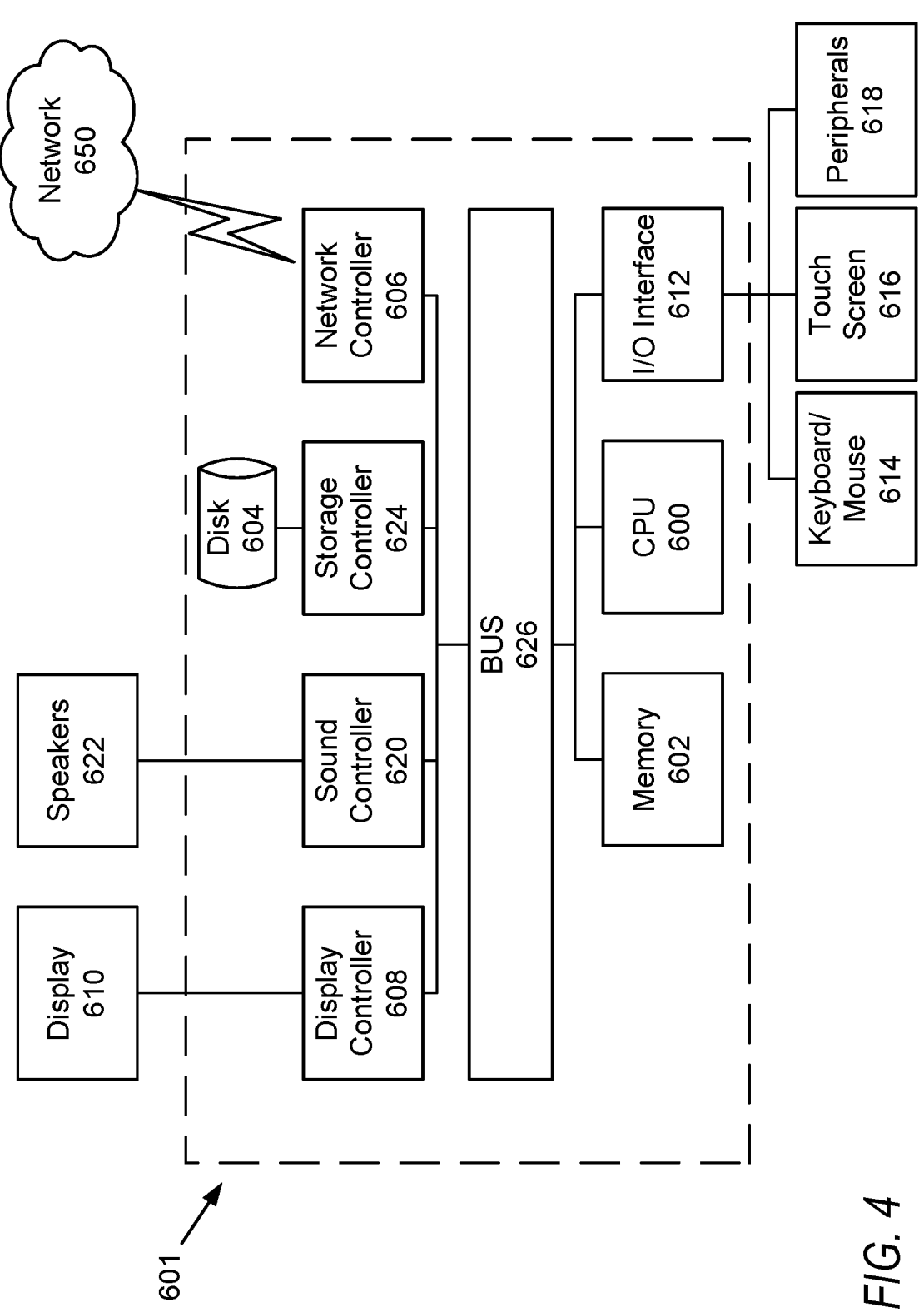
FIG. 4 is a schematic of a hardware configuration of a device for performing a method, according to an exemplary embodiment of the present disclosure.

Next, a hardware description of a device 601 according to exemplary embodiments is described with reference to FIG. 4. In FIG. 4, the device 601, which can be any of the above described devices, including the servers 1500 and 1501 or any of the user devices 1100, 1101, 110$n$, includes process-ing circuitry. The processing circuitry includes one or more of the elements discussed next with reference to FIG. 4. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device 601 communicates, such as a server or computer.

Further, the claimed advancements may be provided as a utility application, background daemon, or component of an operating system, or combination thereof, executing in conjunction with CPU 600 and an operating system such as Microsoft Windows, UNIX, Solaris, LINUX, Apple MAC-OS and other systems known to those skilled in the art.

The hardware elements in order to achieve the device 601 may be realized by various circuitry elements, known to those skilled in the art. For example, CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the processes described above.

The device 601 in FIG. 4 also includes a network controller 606, such as an Intel Ethernet PRO network interface card from Intel Corporation of America, for interfacing with network 650. and to communicate with the other devices. As can be appreciated, the network 650 can be a public network, such as the Internet, or a private network such as an LAN or WAN network, or any combination thereof and can also include PSTN or ISDN sub-networks. The network 650 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device 601 further includes a display controller 608, such as a NVIDIA Geforce GTX or Quadro graphics adaptor from NVIDIA Corporation of America for interfacing with display 610, such as an LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners.

A sound controller 620 is also provided in the device 601 to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the device 601. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Embodiments of the present disclosure may also be set forth in the following parentheticals.

(1) A method for evaluating synthesized speech, comprising receiving, via processing circuitry, a speech sample in a first language; and determining, via the processing circuitry, a rating of the speech sample based on an encoding of the speech sample by an artificial intelligence encoding model, the rating of the speech sample corresponding to a naturalness of the speech sample, wherein the encoding of the speech sample is based on a first training stage of the encoding model using a first set of training data and a second training stage of the encoding model using a second set of training data, the first set of training data includes unlabeled speech audio, unlabeled text, and paired speech audio and text data in the first language and at least one additional language, and the second set of training data includes rated speech audio.

(2) The method of (1), further comprising receiving a language identifier or a text sample corresponding to the speech sample and determining the rating of the speech sample based on the language identifier or the text sample.

(3) The method of (1) to (2), wherein the first training stage of the artificial intelligence encoding model includes classifying, via the processing circuitry, the first set of training data using connectionist temporal classification.

(4) The method of (1) to (3), wherein the first training stage of the artificial intelligence encoding model includes predicting, via the processing circuitry, a masked word in the first set of training data.

(5) The method of (1) to (4), wherein the second set of training data includes rated speech audio in the first language and a second language.

(6) The method of (1) to (5), wherein the second training stage of the artificial intelligence encoding model includes predicting, via the processing circuitry, a sample rating of a training sample in the second set of training data.

(7) The method of (1) to (6), wherein the encoding of the speech sample includes a text mapping of the speech sample.

(8) The method of (1) to (7), wherein the rating is a predicted mean opinion score (MOS) rating.

(9) A device comprising processing circuitry configured to receive a speech sample in a first language, and determine a rating of the speech sample based on an encoding of the speech sample by an artificial intelligence encoding model, the rating of the speech sample corresponding to a naturalness of the speech sample, wherein the encoding of the speech sample is based on a first training stage of the encoding model using a first set of training data and a second training stage of the encoding model using a second set of training data, the first set of training data includes unlabeled speech audio, unlabeled text, and paired speech and text data in the first language and at least one additional language, and the second set of training data includes rated speech audio.

(10) The device of (9), wherein the first training stage of the artificial intelligence encoding model includes classifying the first set of training data using connectionist temporal classification.

(11) The device of (9) to (10), wherein the first training stage of the artificial intelligence encoding model includes predicting a masked word in the first set of training data.

(12) The device of (9) to (11), wherein the second set of training data includes rated speech audio in the first language and a second language.

(13) The device of (9) to (12), wherein the rating is a predicted mean opinion score (MOS) rating.

(14) A non-transitory computer-readable storage medium for storing computer-readable instructions that, when executed by a computer, cause the computer to perform a method, the method comprising receiving a speech sample in a first language; and determining a rating of the speech sample based on an encoding of the speech sample by an artificial intelligence encoding model, the rating of the speech sample corresponding to a naturalness of the speech sample, wherein the encoding of the speech sample is based on a first training stage of the encoding model using a first set of training data and a second training stage of the encoding model using a second set of training data, the first set of training data includes unlabeled speech audio, unlabeled text, and paired speech and text data in the first language and at least one additional language, and the second set of training data includes rated speech audio.

(15) The non-transitory computer-readable storage medium of (14), wherein the first training stage of the artificial intelligence encoding model includes classifying the first set of training data using connectionist temporal classification.

(16) The non-transitory computer-readable storage medium of (14) to (15), wherein the first training stage of the artificial intelligence encoding model includes predicting a masked word in the first set of training data.

(17) The non-transitory computer-readable storage medium of (14) to (16), wherein the second set of training data includes rated speech audio in the first language and a second language.

(18) The non-transitory computer-readable storage medium of (14) to (17), wherein the second training stage includes predicting a sample rating of a training sample in the second set of training data.

(19) The non-transitory computer-readable storage medium of (14) to (18), wherein the encoding of the speech sample includes a text mapping of the speech sample.

(20) The non-transitory computer-readable storage medium of (14) to (19), wherein the rating is a predicted mean opinion score (MOS) rating.

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method for evaluating synthesized speech, comprising:

receiving, via processing circuitry, a speech sample in a first language;

receiving a language identifier indicating a language of the speech sample;

determining, via the processing circuitry, a rating of the speech sample based on an encoding of the speech sample by an artificial intelligence encoding model, the rating of the speech sample corresponding to a naturalness of the speech sample; and correcting, using the language identifier indicating the language of the speech sample, the rating of the speech sample, wherein the encoding of the speech sample is based on a first training stage of the encoding model using a first set of training data and a second training stage of the encoding model using a second set of training data, the second set of training data comprising utterances and language identifiers for the utterances, the first set of training data includes unlabeled speech audio, unlabeled text, and paired speech audio and text data in the first language and at least one additional language, and the second set of training data includes rated speech audio and language identifiers for the rated speech audio.

2. The method of claim 1, wherein the first training stage of the artificial intelligence encoding model includes classifying, via the processing circuitry, the first set of training data using connectionist temporal classification.

3. The method of claim 1, wherein the first training stage of the artificial intelligence encoding model includes predicting, via the processing circuitry, a masked word in the first set of training data.

4. The method of claim 1, wherein the second set of training data includes rated speech audio in the first language and a second language.

5. The method of claim 1, wherein the second training stage of the artificial intelligence encoding model includes predicting, via the processing circuitry, a sample rating of a training sample in the second set of training data.

6. The method of claim 1, wherein the encoding of the speech sample includes a text mapping of the speech sample.

7. The method of claim 1, wherein the rating is a predicted mean opinion score (MOS) rating.

8. A device comprising:

processing circuitry configured to:

receive a speech sample in a first language;

receive a language identifier indicating a language of the speech sample;

determine a rating of the speech sample based on an encoding of the speech sample by an artificial intelligence encoding model, the rating of the speech sample corresponding to a naturalness of the speech sample; and correct, using the language identifier indicating the language of the speech sample, the rating of the speech sample, wherein the encoding of the speech sample is based on a first training stage of the encoding model using a first set of training data and a second training stage of the encoding model using a second set of training data, the second set of training data comprising utterances and language identifiers for the utterances, the first set of training data includes unlabeled speech audio, unlabeled text, and paired speech and text data in the first language and at least one additional language, and the second set of training data includes rated speech audio and language identifiers for the rated speech audio.

9. The device of claim 8, wherein the first training stage of the artificial intelligence encoding model includes classifying the first set of training data using connectionist temporal classification.

10. The device of claim 8, wherein the first training stage of the artificial intelligence encoding model includes predicting a masked word in the first set of training data.

11. The device of claim 8, wherein the second set of training data includes rated speech audio in the first language and a second language.

12. The device of claim 8, wherein the rating is a predicted mean opinion score (MOS) rating.

13. A non-transitory computer-readable storage medium for storing computer-readable instructions that, when executed by a computer, cause the computer to perform a method, the method comprising:

receiving a speech sample in a first language;

receiving a language identifier indicating a language of the speech sample;

determining a rating of the speech sample based on an encoding of the speech sample by an artificial intelligence encoding model, the rating of the speech sample corresponding to a naturalness of the speech sample; and correcting, using the language identifier indicating the language of the speech sample, the rating of the speech sample, wherein the encoding of the speech sample is based on a first training stage of the encoding model using a first set of training data and a second training stage of the encoding model using a second set of training data, the second set of training data comprising utterances and language identifiers for the utterances, the first set of training data includes unlabeled speech audio, unlabeled text, and paired speech audio and text data in the first language and at least one additional language, and the second set of training data includes rated speech audio and language identifiers for the rated speech audio.

14. The non-transitory computer-readable storage medium of claim 13, wherein the first training stage of the artificial intelligence encoding model includes classifying the first set of training data using connectionist temporal classification.

15. The non-transitory computer-readable storage medium of claim 13, wherein the first training stage of the artificial intelligence encoding model includes predicting a masked word in the first set of training data.

16. The non-transitory computer-readable storage medium of claim 13, wherein the second set of training data includes rated speech audio in the first language and a second language.

17. The non-transitory computer-readable storage medium of claim 13, wherein the second training stage includes predicting a sample rating of a training sample in the second set of training data.

18. The non-transitory computer-readable storage medium of claim 13, wherein the rating is a predicted mean opinion score (MOS) rating.

* * * * *